June 12, 1962  J. L. GOLDMAN  3,038,432
NEW TYPE GENERAL CARGO CARRYING SHIP
Original Filed Nov. 9, 1956  6 Sheets-Sheet 4
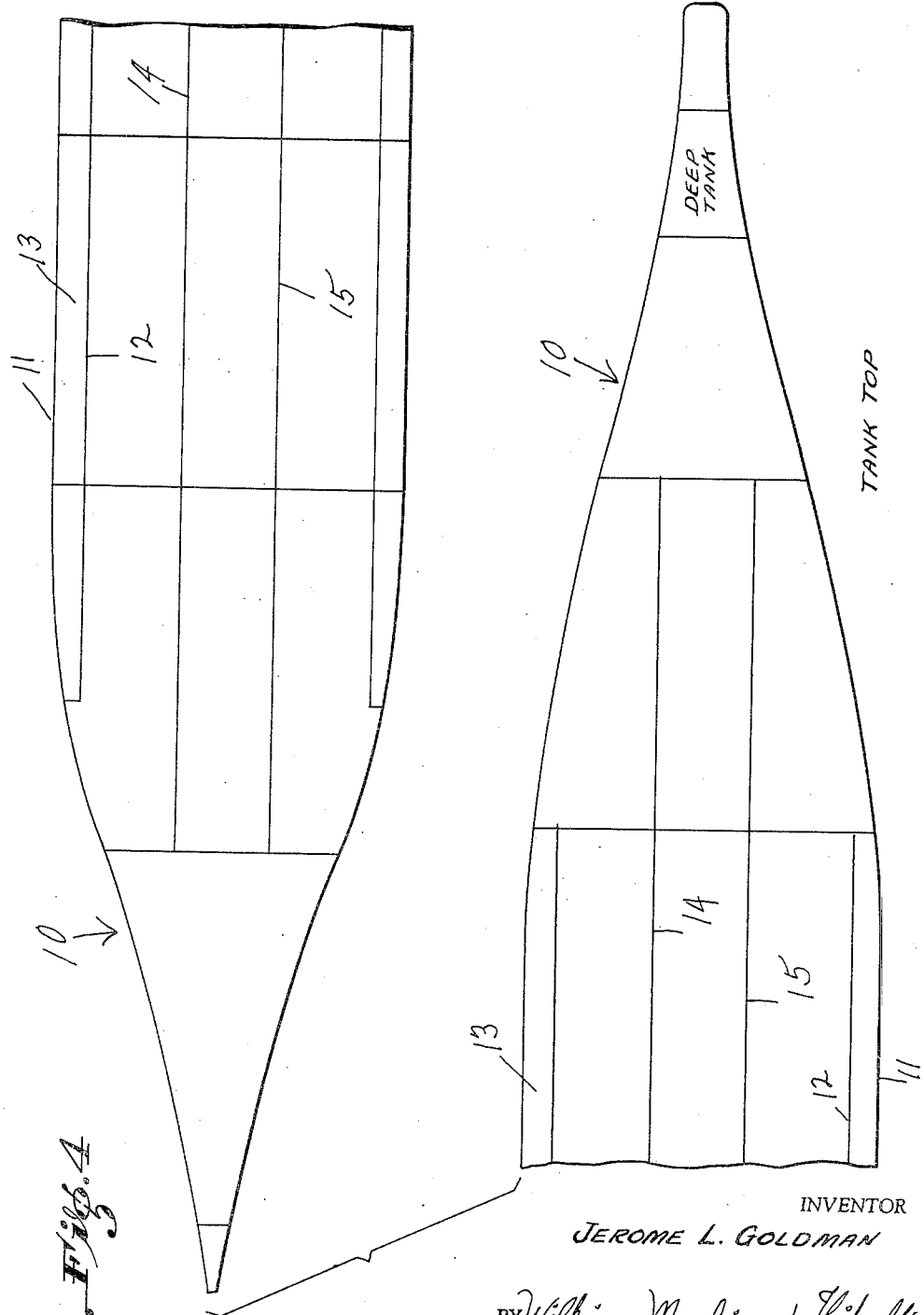
INVENTOR
JEROME L. GOLDMAN
BY Wilkinson, Mawhinney & Theibault
ATTORNEYS

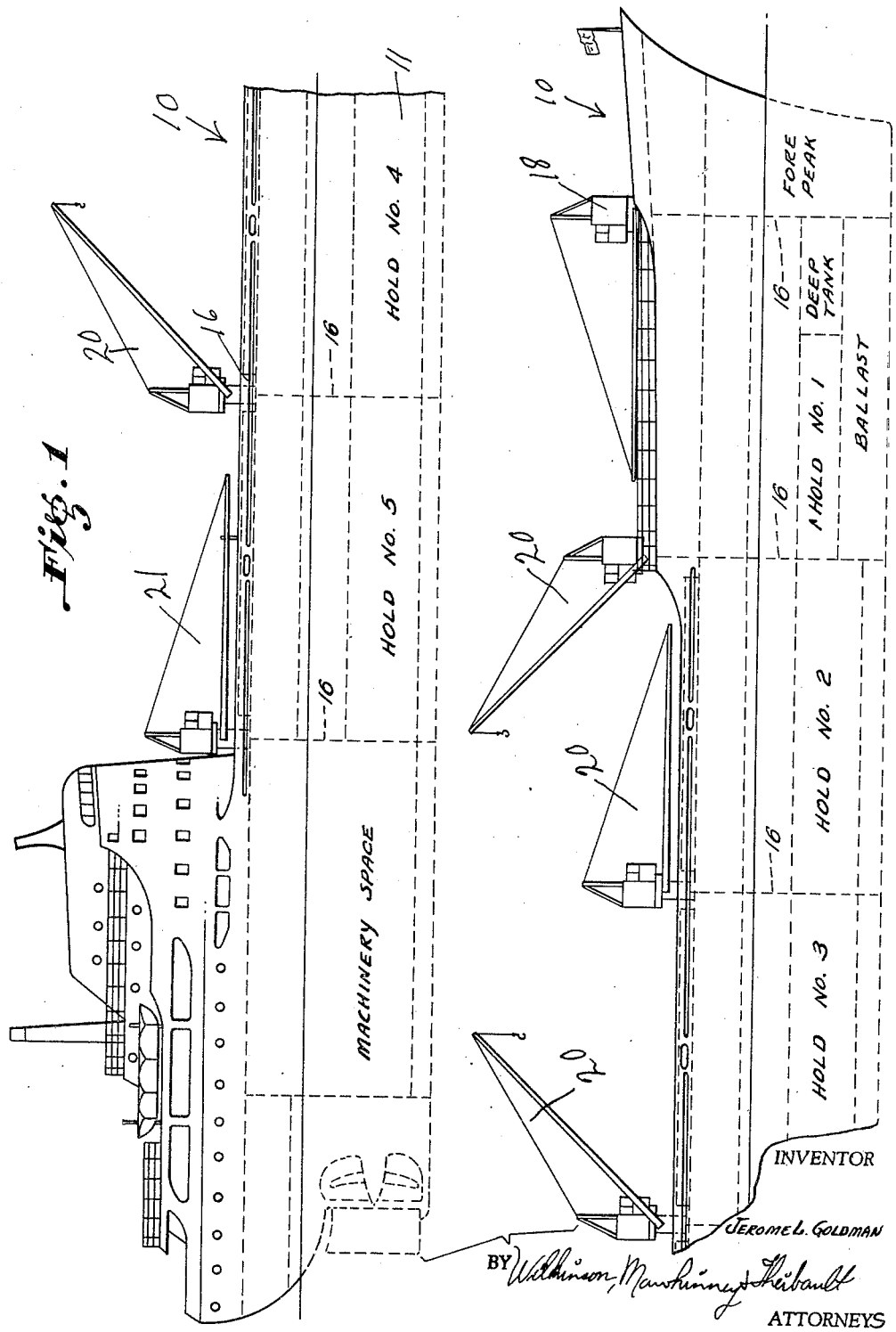

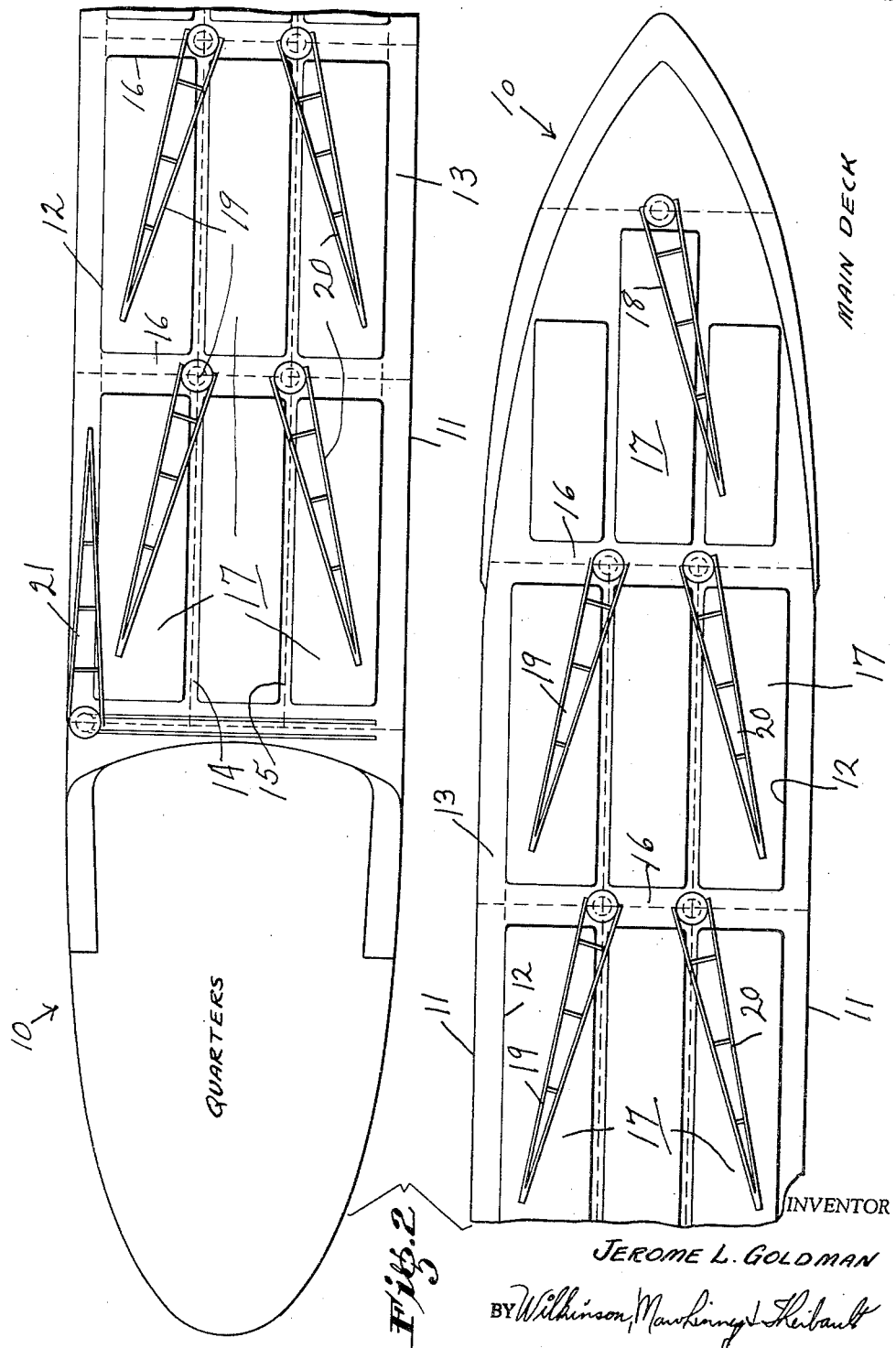

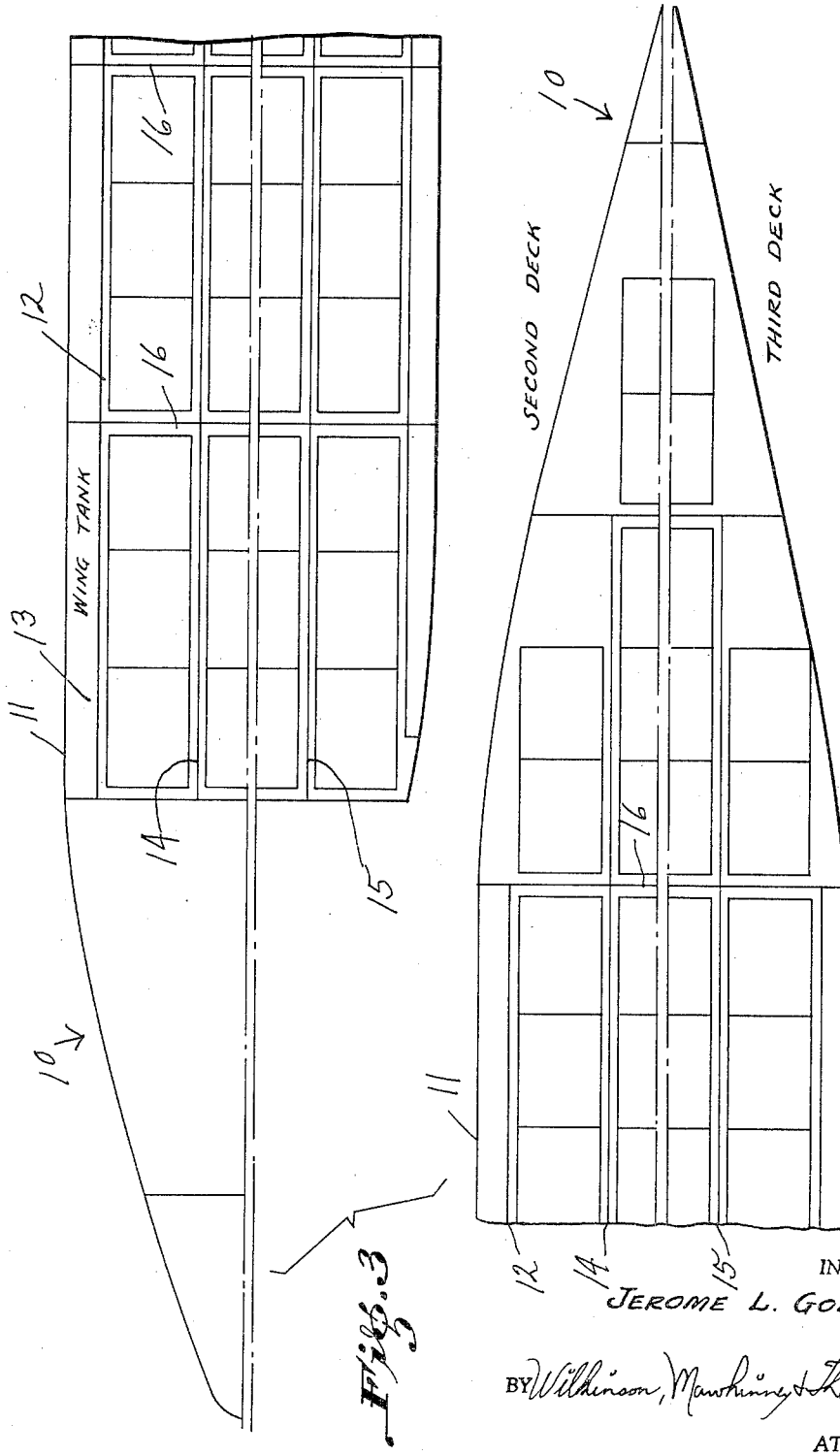

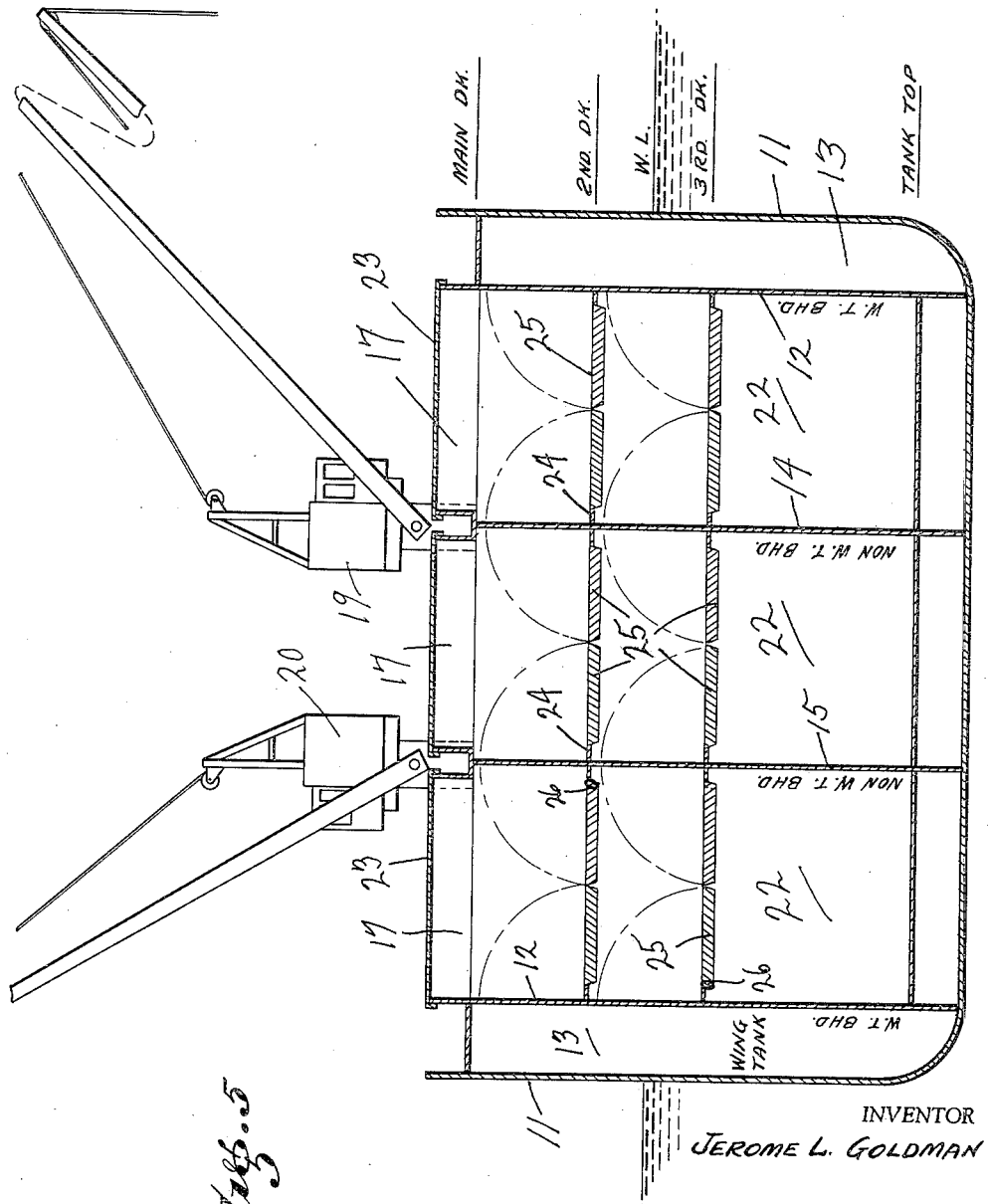

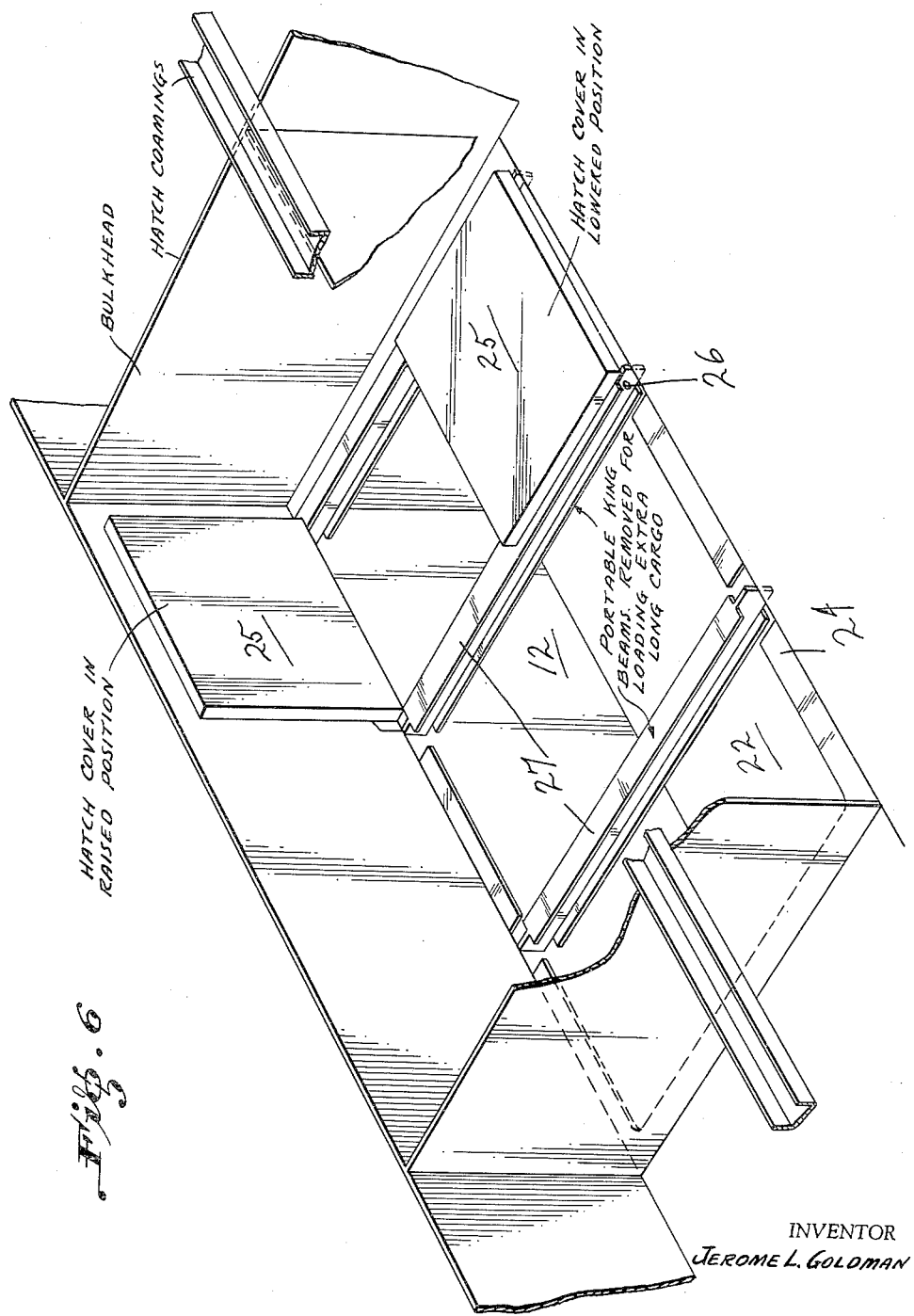

United States Patent Office 3,038,432
Patented June 12, 1962

3,038,432
NEW TYPE GENERAL CARGO CARRYING SHIP
Jerome L. Goldman, New Orleans, La., assignor to Friede & Goldman, Inc., New Orleans, La., a corporation of Louisiana
Continuation of application Ser. No. 621,394, Nov. 9, 1956. This application Jan. 4, 1960, Ser. No. 2,089
2 Claims. (Cl. 114—72)

The present invention relates to new type general cargo carrying ship and is a continuation application of my similarly entitled application Serial No. 621,394, filed November 9, 1956, now abandoned.

This invention relates to an improvement in the design of dry general cargo merchant ships, carrying general cargo to and from various ports in the world.

The types of vessels in conventional service under all flags generally are similar, except as to size, with respect to unsymmetrical shapes of cargo holds. They essentially consist of fairly standard designs of hulls, with several unsymmetrical cargo holds of various sizes extending the full width of the ship from shell to shell and divided longitudinally by transverse bulkheads. In order to obtain adequate strength of the vessel hull, considering it as a box girder, the common top of the cargo holds must consist of continuous heavy steel decking, having relatively small cargo hatches in such decks, for loading and unloading cargo.

To handle packaged, baled, drummed or similar dry general cargo into and out of such cargo holds, by means of conventional booms, mounted on masts or king posts, in conjunction with fixed winches, whips, slings, nets, etc., requires that the load (from 1 to 3 tons) be picked up from the wharf or pier, transferred to a point in the air directly above the hatch, dropped into the hold on to a spot, directly under that point, and then released. It then has to be man-handled by stevedores to the outer boundaries of the hold, and as additional cargo is loaded it has to be stacked. Due to getting in one another's way, and to safety precautions when cargo is being lowered, using two gangs instead of one per hold only increases the loading rate by approximately 40% while the cost is doubled. The same is true of course when unloading.

This invention embodies a new design of general cargo ship, the hull providing adequate strength and having a multiplicity of hatches of essentially the same area as the symmetrical holds they cover. It also embodies the use of a multiplicity of whirley cranes, or bridge crane lifting devices or cranes on piers or barges, or other shipboard cranes or an equivalent mast-boom-winch system, capable of rotation and of reaching over the side of the ship and of dropping general cargo (including conventional containers) into any part of any cargo hold directly, and of tiering same. It also embodies the use of hinged between-deck sections in the symmetrical holds of approximately the same areas as the main hatches.

Adequate strength of the hull is provided under my invention by the use of inner and outer hulls and one, two or more additional longitudinal bulkheads. This provides a large number of essenitally symmetrical cargo holds over the major portion of the ship which are necessary to obtain most efficient utilization of space, permits the carrying of pay liquid cargo or ballast in the unsymmetrical tanks formed between the two skins and results in strength of vessel equivalent to or greater than that of the conventional box girder design ship.

The loading or unloading time of the ship embodied in my invention is estimated to be approximately only 60% of that required by ships of conventional design, with consequent reduction in cargo handling costs, and time in port.

The combination of many cranes of the capacity shown, or equivalent alternate machinery, and of the symmetrical cargo holds with hatches and hinged between deck sections of very nearly the same area, results in a ship which, if cargo available so dictates, may be used to carry bulk cargoes such as grain, coal, ores, sand, etc., in some or all of the holds as desired. Such a vessel used as a bulk carrier could unload at the rate of approximately 800 tons per hour with its own cranes, or much more rapidly if shore or floating cranes should be used in addition. The subdivision of the normal number of conventional cargo holds into 2, 3 or more times that number by the longitudinal bulkheads, together with full area hatches, and multiple cargo cranes, for example, means that general cargo can be worked much more rapidly with only one gang of stevedores per hatch.

My invention contains a new feature to accomplish this same task, namely, a type of hinged between deck sections and king beams. These hinged sections permit loading into the lower holds when they are raised or folded vertically out of the way. When they are hinged down, cargo can be stowed directly upon them. Any number of levels of these hinged between decks can be provided to suit cargo needs. While it is described as hinged, any other suitable form of mechanism may be employed, including power operated accordion panels and other devices used in modern ships' hatch covers. Also, in lieu of king beams, hinged sections may be of cantilever type, supported at the hinged end and left free at the outer end, which eliminates the need for king beams. Other structural arrangements may be utilized to accomplish the provision of adequate structural strength.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a side elevational view of the new design cargo vessel in which the outboard profile shows an elevation of the new hull design, and particularly outlines the several cranes, holds, and hatches.

FIGURE 2 shows a main deck plan illustrating a double hull design, crane arrangement, and multiplicity of hatches, each of the same area as corresponding cargo holds.

FIGURE 3 is a plan view through the second and third decks showing the double hull design and additional longitudinal bulkheads with multiplicity of cargo holds.

FIGURE 4 is a plan view of tank top level showing longitudinal bulkheads, cargo holds and additional details of the double hull.

FIGURE 5 shows a midship transverse vertical section illustrating in broken lines the movement of the hinged between deck sections.

FIGURE 6 is a fragmentary isometric view showing the hinged between deck sections in connection with portable king beams.

Referring more particularly to the drawings, 10 designates a cargo vessel pursuant to the invention having spaced skins or hulls 11, 12, of which 11 is the outer hull and 12 the inner hull spaced therefrom to provide wing tanks 13 adapted to receive ballast or cargo.

A number of longitudinal bulkheads spaced apart and spaced from the inner hull 12 may be provided in conjunction with transverse bulkheads 16 to afford symmetrical hatches 17 leading to the holds 22 which constitute the cargo space of the ship. In the single embodiment of the invention illustrated in the drawings, two longitudinal bulkheads 14 and 15 are provided.

As will appear more particularly from FIGURE 2, the foremost hatch 17 is served by a fore crane or the like 18, while pairs of cranes or the like 19 and 20 are affixed to the transverse beams 16 or other portions of the hull or structure of the ship. These intermediate cranes 19, 20 serve cargo spaces which are between the longitudinal bulkheads 14 and 15 and between the bulkheads and the inner hulls of the ship. An aft crane 21, shown in FIGURE 2, is also used to service the hold 5 in FIGURE 1, the after crane 21 being also illustrated in FIGURE 2.

In FIGURE 5 the hatches 17 are shown as closed by hatch covers 23 which are arranged above the various cargo holds 22. In these cargo holds are arranged between-decks 24 to carry sections or between-deck hatch covers 25 which may be hinged at 26 or otherwise mounted in the between-decks 24 in a manner to close or open the hatches of these between-decks.

Portable king beams 27 are removably mounted in the between-decks 24 for accommodating the hinged sections 25. As many of these between-decks 24 may be provided as desired, one spaced above the other and the sections 25 are arranged directly below the hatch covers 23.

It will be noted from FIGURE 5 that the wing tanks 13 in connection with the two spaced skins 11, 12 provide a strong construction for the purposes heretofore stated and the bottom of the ship may be similarly formed.

In the use of the device, the hatch covers 23 are removed and the hinged or other sections 25 are raised as indicated in the broken lines in FIGURE 5 so as to open the entire vertical space from the upper deck all the way down to the bottom in the various holds 22 at opposite sides of the partitions 14 and 15 and within the inner hull 12.

The cranes which are associated with these holds are then put into operation to raise cargo from the dock, elevate the same above the hatches 17 and lower such cargo into the holds 22. It will be noted that by removing the hatch covers 23 and opening the sections 25 that access is had to all parts of the hold compartments 22 inasmuch as the hatches are substantially coextensive with these symmetrical compartments and hatches. For example, in practice a hold 70′ x 24′ would have a hatch approximately 62′ x 20′.

When the lower portion of a hold 22 below a between-deck 24 is filled the hinged sections in that deck may be lowered to a closed position so as to assume the weight of additional cargo placed thereupon, and when this space is filled up to the next intermediate deck 24, the sections 25 in that deck may also be lowered to the closed position in which they also provide a floor for receiving and supporting cargo. Thus the loads in any particular hold 22 are divided as to support between the bottom of the ship and the various hinged sections 25 at the between decks 24. In this way the cargo in the lowermost compartment of the hold 22 will not be subject to the weight of the superposed cargo in the sections of the hold above the doors or sections 25.

In unloading at port, the hatch covers 23 are removed and the cranes operated to lift the cargo from the uppermost section of a hold. After all of the cargo has been removed from this section down to the first pair of doors or hatches 25, the latter are raised so as to open the second or intermediate section of the hold to give access to the crane for the purpose of lifting the cargo from this section, the crane also turning to lower the same upon dockside.

All cranes may be in operation at the same time so that the cargo may be rapidly loaded into the ship. In other words the time of loading the complete ship is only the time required to load one transverse series of the cargo holds. On the basis of five cargo holds as shown in FIGURE 1, with cranes for each hold, the loading time of the entire ship will be only one-fifth that of loading the entire ship where each of the five holds has to be loaded in time sequence. The same is true for the unloading operation.

Although I have disclosed herein the best form of the invention known to me at this time, I reserve the right to all such modifications and changes as may come within the scope of the following claims.

What is claimed is:

1. In a cargo ship, a hull having a longitudinal cargo area and machinery area, a plurality of flat coplanar longitudinal bulkheads extending upwardly continuously defining a smooth uninterrupted partition wall from proximate the bottom of the hull of said vessel to an uppermost continuous deck thereof to divide said hull into a plurality of substantially equal symmetrical holds transversely from forward aft through the entire longitudinal cargo hold area of the hull, transverse bulkheads dividing the longitudinal cargo hull area into a plurality of cargo receiving holds fore and aft, a multiplicity of loading hatches transversely of the hull positioned to cover said cargo holds, each hatch being of substantially the same area as the hold which it covers, at least one pair of horizontal hold dividing deck members in each hold secured to a structural member of the hull spaced above the bottom thereof and at least one cover connected to the hold dividing deck members of approximately the same area as said loading hatches, said covers being movable to permit loading of the compartment beneath the covers, said covers when in the lowered 'tween deck cargo supporting position defining a substantially flat uninterrupted smooth cargo support area and said covers defining a support upon which a load may be carried without imposing increased weight load on the cargo immediately beneath same.

2. A ship as claimed in claim 1 wherein said longitudinal bulkheads are primary hull structural members.

References Cited in the file of this patent

UNITED STATES PATENTS

| | | |
|---|---|---|
| 1,033,403 | Hough | July 23, 1912 |
| 1,835,855 | Fliegel | Dec. 8, 1931 |
| 2,363,797 | Lovfald | Nov. 28, 1944 |
| 2,480,318 | Bowes | Aug. 30, 1949 |
| 2,539,168 | Smith et al. | Jan. 23, 1951 |

FOREIGN PATENTS

| | | |
|---|---|---|
| 8,002 | Great Britain | of 1888 |
| 23,854 | Great Britain | of 1901 |
| 25,964 | Great Britain | of 1905 |
| 11,078 | Great Britain | of 1906 |
| 118,898 | Great Britain | Sept. 19, 1918 |
| 619,436 | Great Britain | Mar. 9, 1949 |
| 977,480 | France | Nov. 15, 1950 |
| 58,075 | France | May 6, 1953 |
| 1,059,320 | France | Nov. 10, 1953 |
| 1,129,015 | France | Sept. 3, 1956 |